(12) United States Patent
Takizawa et al.

(10) Patent No.: US 7,003,612 B1
(45) Date of Patent: Feb. 21, 2006

(54) PC SWITCHING DEVICE SELECTIVELY SWITCHING BETWEEN AN INPUT DEVICE AND A PLURALITY OF COMPUTERS HAVING DIFFERENT ELECTRIC POWER CONTROL MECHANISMS

(75) Inventors: Kiyomitsu Takizawa, Iiyama (JP); Fujio Seki, Iiyama (JP); Hideo Yumoto, Iiyama (JP)

(73) Assignee: Fujitsu Takamisawa Component Limited, Tokyo (JP)

(*) Notice: Subject to any disclaimer, the term of this patent is extended or adjusted under 35 U.S.C. 154(b) by 166 days.

(21) Appl. No.: 09/632,587

(22) Filed: Aug. 4, 2000

(30) Foreign Application Priority Data

Aug. 6, 1999 (JP) ................................ 11-224019
Sep. 30, 1999 (JP) ................................ 11-278980

(51) Int. Cl.
G06F 13/00 (2006.01)
(52) U.S. Cl. .................. 710/300; 710/300; 710/305; 713/340; 315/291; 345/168; 307/44
(58) Field of Classification Search ............... 710/100, 710/305, 311, 1, 2, 20, 36, 316, 43, 300, 38, 710/62; 713/300–340; 345/168; 307/44; 341/22; 340/641; 315/291
See application file for complete search history.

(56) References Cited

U.S. PATENT DOCUMENTS

| | | | | |
|---|---|---|---|---|
| 4,412,245 A | * | 10/1983 | Kwok ........................ 725/149 |
| 4,866,667 A | * | 9/1989 | Shimada ..................... 710/316 |
| 5,227,666 A | * | 7/1993 | Asprey ........................ 307/44 |
| 5,410,713 A | * | 4/1995 | White et al. ................ 713/330 |
| 5,499,377 A | * | 3/1996 | Lee ............................. 709/244 |
| 5,629,694 A | * | 5/1997 | Simon et al. ................. 341/22 |
| 5,689,244 A | * | 11/1997 | Iijima et al. ................ 340/3.9 |
| 5,754,881 A | * | 5/1998 | Aas .............................. 710/2 |
| 5,935,254 A | * | 8/1999 | Lee ........................... 713/340 |
| 6,069,615 A | * | 5/2000 | Abraham et al. ........... 345/168 |
| 6,138,191 A | * | 10/2000 | Fujii et al. ................... 710/73 |
| 6,225,912 B1 | * | 5/2001 | Tanaka et al. .............. 340/641 |
| 6,269,288 B1 | * | 7/2001 | Smith ......................... 700/295 |
| 6,388,658 B1 | * | 5/2002 | Ahern et al. ................ 345/168 |
| 6,400,101 B1 | * | 6/2002 | Biebl et al. ................. 315/291 |
| 6,557,170 B1 | * | 4/2003 | Wilder et al. ............... 725/130 |

OTHER PUBLICATIONS

TechEncyclopedia, Transistor, 1981, http://www.techweb.com/encyclopedia/defineterm?term=transistor.*
Network Technology Inc., Network Technologies' New Catalog Features KVM Switching Devices, Apr., 1999.*
Network Technology Inc., Control Multiple Suns with one keyboard, monitor & mouse, http://www.networktechinc.com/srvsw-sn.html.*

(Continued)

*Primary Examiner*—Glenn A. Auve
*Assistant Examiner*—Justin King
(74) *Attorney, Agent, or Firm*—Staas & Halsey LLP

(57) ABSTRACT

This invention is to provide a PC switching device which can be applied to various kinds of PC's, some of which have an electric power control method different from the others.

When a plurality of PC's 621–624, the power of which are controlled by power control keys installed on keyboards are operated by single KB 63 without a power control key, power control switches PC-PSW 1–4 installed on the PC switching device 61 can control the power of the corresponding PC. When switches PC-PSW 1–4 are pressed again, main CPU 610 outputs a key-code to PC's 621–624 through sub-PC's 611–614, and can control the power of PC's.

6 Claims, 17 Drawing Sheets

OTHER PUBLICATIONS

NetWork Technologies Inc., "KEEMUX-P2 (2-Port PS/2 KVM Switch)", 1999.*

42U DirectNet "NTI KEEMUX PC KVM Switch", http://www.42u.com/nti-ps2-kvm-switch.htm.*

Doug Gingrich, "Differential Amplifier", Jul. 13, 1999, University of Alberta, http://www.phys.ualberta.ca/~gingrich/phys395/notes/node110.html.*

Ryan Rosandich, "What you need to know about operational amplifiers", 1996, EC$M magazine, http://ecmweb.com/mag/electric_need_know_operational.*

James Nilsson and Susan Riedel, "Electric Circuits", 1999, Prentice Hall, Inc., Ed. 6, pp 189-194 and 200-201.* eCircuit Center, "", eCircuit Center, http://www.ecircuitcenter.com/circuits/opdif/opdif.htm.*

* cited by examiner

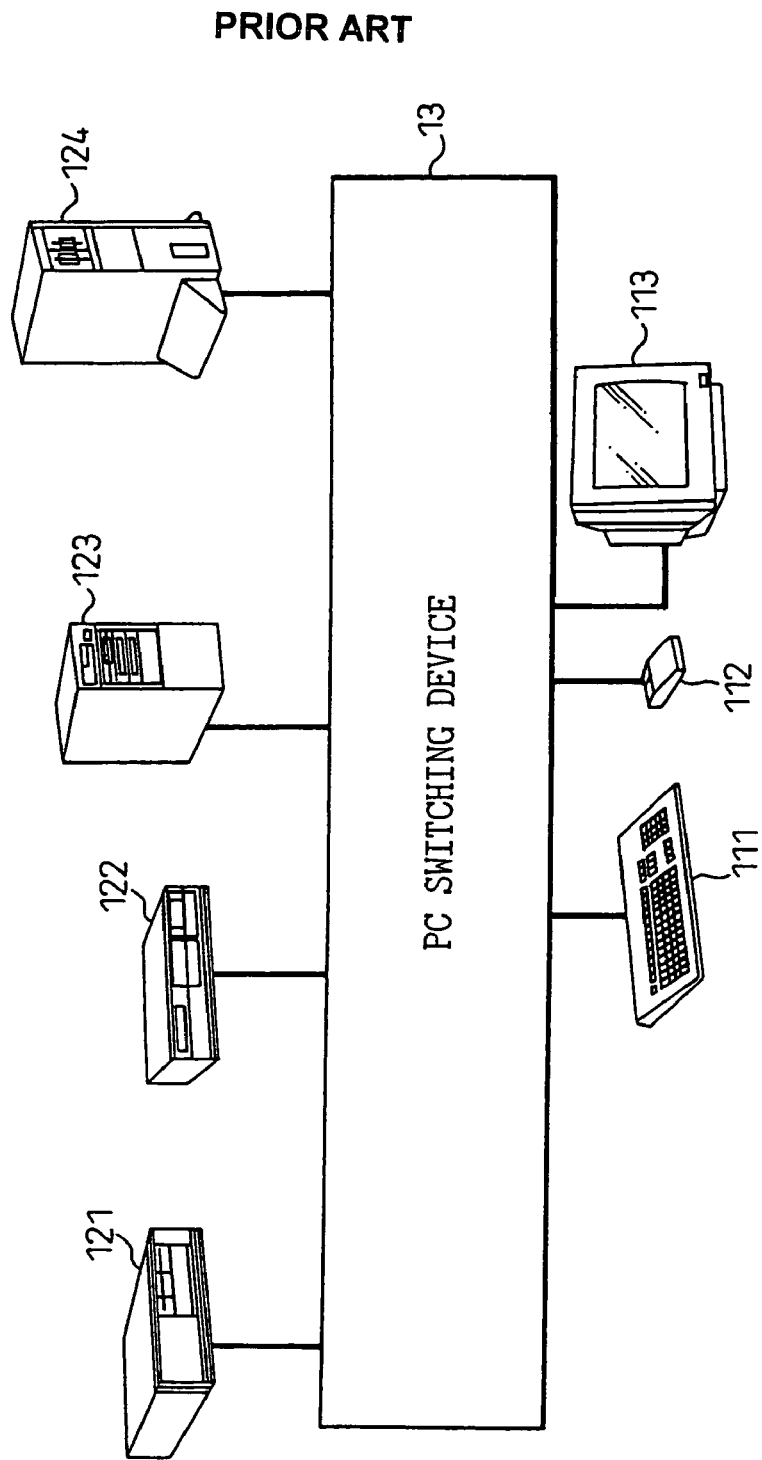

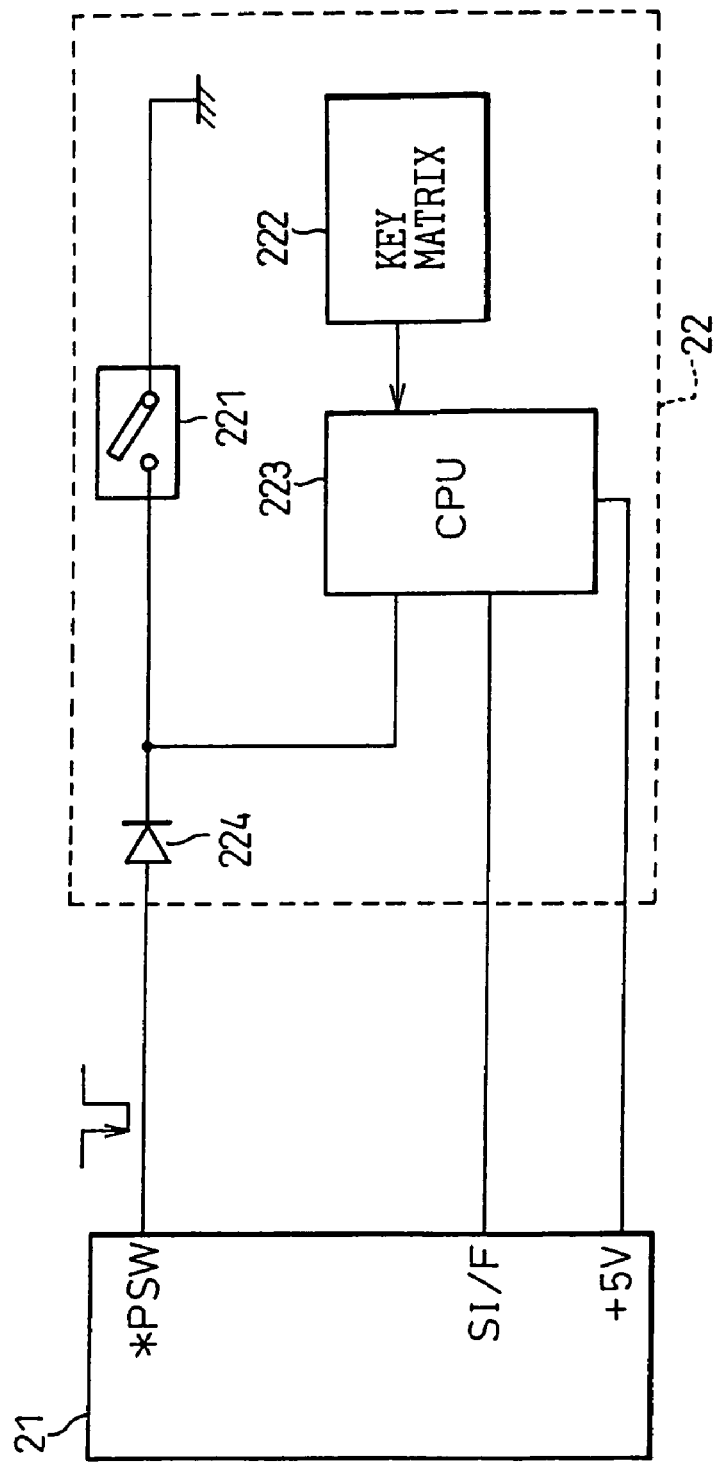

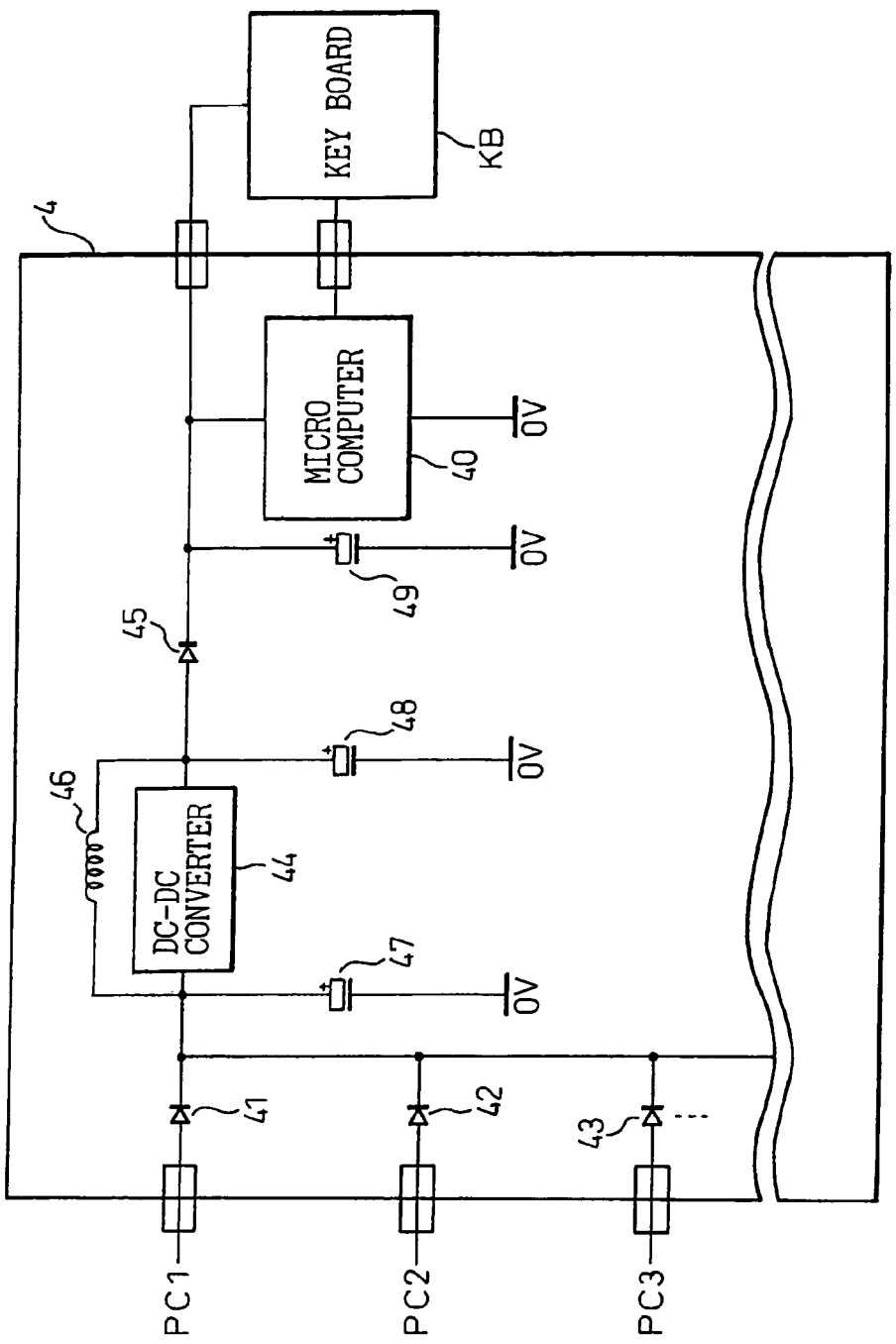

PRIOR ART

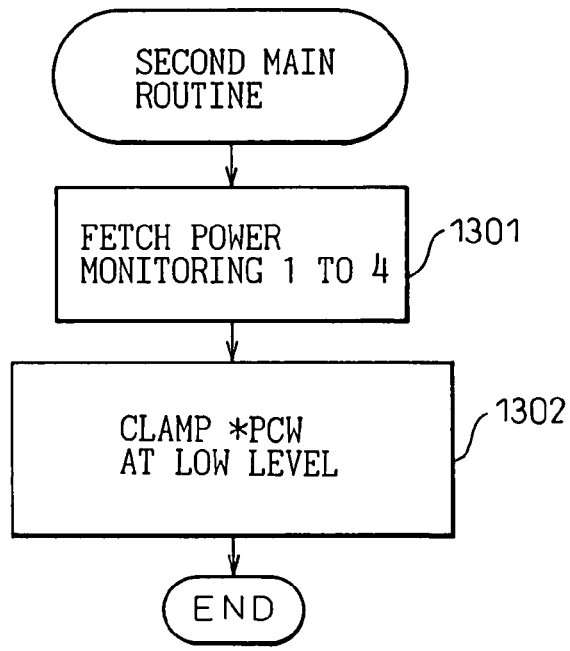
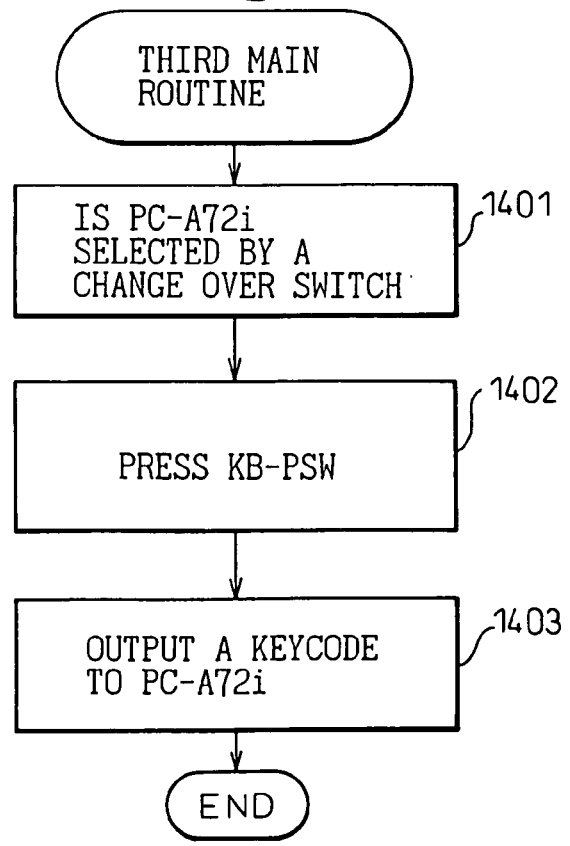

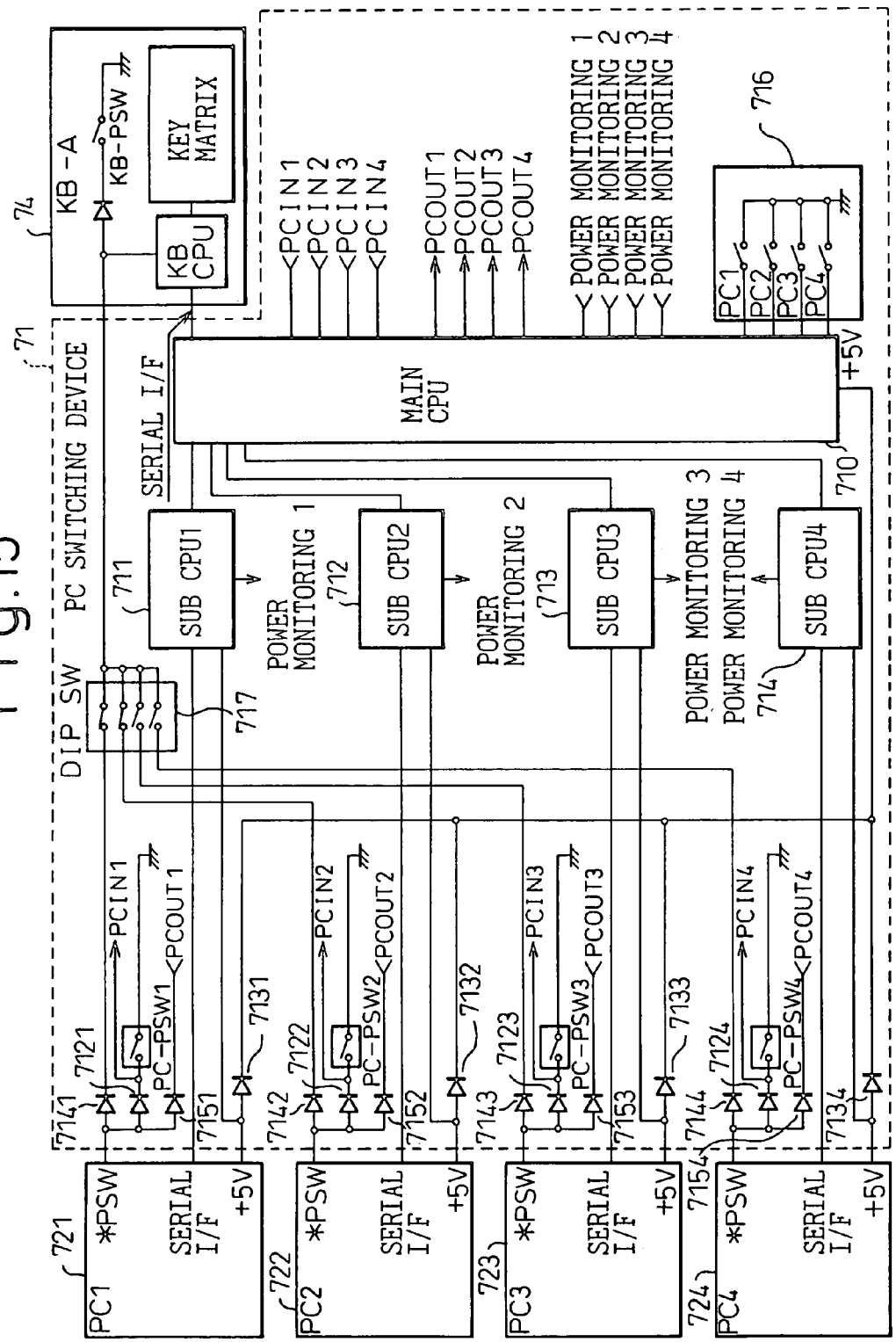

PC SWITCHING DEVICE SELECTIVELY SWITCHING BETWEEN AN INPUT DEVICE AND A PLURALITY OF COMPUTERS HAVING DIFFERENT ELECTRIC POWER CONTROL MECHANISMS

BACKGROUND OF THE INVENTION

1. Field of the Invention

This invention relates a PC switching device which is installed between a keyboard (hereinafter KB) and personal computers (hereinafter PC's) when a plurality of PC's are operated by a single KB, and particularly relates a PC switching device which can be applied to various kinds of PC's, some of which have an electric power control method different from the others, and which is able to prevent the voltage of the electric power supplied to the KB from dropping and the reverse-current of the electric power from flowing.

2. Prior Art

Recently, there are many offices each of which has a plurality of PC's at the office, because of the development of the client-server system and an increase in the number of the power-users who simultaneously operates a plurality of PC's, but wide spaces are required, because each PC requires its own man-machine interface equipment (a keyboard, a pointing device, etc). Note, equipment other than a keyboard and a pointing device, that is, display equipment such as a CRT also belongs to a man-machine interface equipment, but in this specification, the display equipment is not treated as a man-machine interface equipment, because it contains its own electric power system, and does not receive electric power from a PC.

However, man-machine interface equipment is seldom operated simultaneously, and a power-user has to change working positions, where man-machine interface equipment corresponding to PC's are set, when the power-user uses a plurality of PC's.

FIG. 1 is a diagram showing connections between one set of man-machine interface equipment and a plurality of PC's. A PC switching device is installed between the one set of man-machine interface equipment which receives electric power from a corresponding PC, that is, a KB 111 and a mouse 112, and a plurality of PC's 121, 122, 123, and 124.

PC's can be divided into two types, that is, one type is a PC (hereinafter PC-A), the power of which is controlled by a power control key installed on a keyboard, and another type is a PC (hereinafter PC-B) power of which is not controlled by a power control switch on a keyboard, and is controlled by a switch installed on the PC itself.

Keyboards can be into two types, that is, one type is a keyboard (hereinafter KB-A) which has a power control key and another type is a keyboard (hereinafter KB-B) which has no power control key.

Therefore, there are four ways of connecting between PC's and KB's as follows.

1. PC-A is connected to KB-A.
2. PC-A is connected to KB-B.
3. PC-B is connected to KB-A.
4. PC-B is connected to KB-B.

FIG. 2 is a diagram showing connections between PC-A 21 and KB-A 22, and KB-A 22 contains not only KB-PSW 221, but also a key-matrix 222 and a keyboard CPU 223.

Note, one terminal of KB-PSW 221 is connected to a power supply terminal (hereinafter *PSW) of PC-A 21 which supplies a power to man-machine interface equipment through a reverse current protecting diode 224, and its other terminal is earthed. The key-matrix 222 is connected to a serial interface terminal of PC-A 21 (hereinafter SI/F) through the keyboard CPU 223, and the another terminal of KB-PSW 221 is connected to the serial interface terminal.

FIGS. 3A and 3B are flowcharts of a power on/off routine executed in PC-A. FIG. 3A is a flowchart of an off-state management routine, and FIG. 3B is a flowchart of an on-state management routine.

If KB-PSW 221 is pressed when PC-A 21 is in a power-off state, the off-state management routine is executed. A voltage drop at the *PSW terminal of PC-A 21 is detected at step 311, and PC-A 21 is turned on at step 312 so that the *PSW terminal is pulled up to, for example, +5V, and begins to supply power to the man-machine interface machines, and PC-A 21 stops to monitor the voltage of the *PSW terminal.

A press of KB-PSW 221 is transferred to the SI/F of PC-A 21 through the keyboard CPU 223 because monitoring of the voltage of the *PSW terminal is interrupted when the power-source of PC-A 21 is in an on-state, and the on-state management routine is initiated. In the on-state management routine, it is determined whether or not the received code corresponds to the power control key code at step 321, and this routine is terminated after executing power control management such as displaying a window for controlling the power at step 322 when the determination at step 321 is affirmative. Conversely, when the determination at step 321 is negative, this routine is terminated after executing a task corresponding to the received code is executed at step 323.

When KB-A is connected to PC-A, PC-A can be turned on by KB-PSW 221 installed on KB-A and prepared to be turned off.

When KB-B is connected to PC-A, this connection is meaningless because the power of PC-A cannot be controlled.

Both KB-A and KB-B can be connected to PC-B, because PC-B can be controlled by a power control switch installed on the PC-B cabinet.

Therefore, it is necessary to install a PC switching device between the PC's and a KB in order to make it possible to connect any of type of PC to any type of KB.

The PC switching device and one set of man-machine interface equipment receive power from the PC which has the highest *PSW voltage among the PC's connected to the PC switching device and one set of man-machine interface equipments, and reverse current protecting diodes are applied to prevent a reverse-current from flowing from the PC with the highest *PSW voltage to the other PC's.

A general diode, however, has a forward voltage drop, for example, 0.25V, and the man-machine interface equipments can be normally operated when the voltage of the power source is within (5±0.25V). When the highest voltage at a *PSW terminal of one PC is 5V, the voltage supplied to the man-machine interface equipments through the PC switching device may be lower than the voltage at which the man-machine interface equipment are normally driven.

To avoid a forward voltage drop, a relay or a transistor (including a field effect transistor) can be applied as a reverse current protecting device.

A relay, however, is a pure mechanical device, and has a drawback, that is, it has a short life. A transistor must be turned on in order to flow current though the transistor, and it must also be turned off in order to interrupt current though the transistor because the reverse current cannot be interrupted when it is kept in on-state.

FIG. 4 is a circuit diagram of a conventional PC switching device which is applied to solve the above problem, and shows the case where one KB is connected to three PC's PC1–3 through a PC switching device 4.

The *PSW terminals of PC's PC1–3 are connected to an input terminal of the DC—DC converter 44 through three reverse-current protecting diodes 41–43 in parallel.

The voltage supplied from the *PSW terminal which has the highest voltage among the *PSW terminals of PC's PC1–3 is stepped up by the DC—DC converter 44, and the power with stepped up voltage is supplied to a microcomputer 40 installed in the PC switching device 4, and KB through a reverse-current protecting diode 45.

Therefore, following problems occur in order to connect both types of KB's to both types of PC's.

FIG. 5 is a diagram showing connections when PC-A and PC-B are connected to KB-B though the PC switching device, but it is impossible to control power of PC-A by KB-B because KB-B is not equipped with a KB-PSW. (Problem 1)

FIG. 6 is a diagram showing connections when PC-A's are connected to KB-A though the PC switching device, but it is impossible selectively to control power of specified PC's though all PC's can be turned on simultaneously. (Problem 2)

When a step-up circuit is installed in a PC switching device, it is necessary to install not only an inductor 46 in parallel to the DC—DC converter 44, but also condensers 47–49 to remove ripples at the input and output terminals of the DC—DC converter 44 and the cathode terminal of the reverse-current protecting diode 45. But the configuration becomes very complex, and the price of the PC switching device becomes high because the above elements are expensive. (Problem 3)

Furthermore, it is not avoidable that the efficiency of the DC—DC converter 44 deteriorates, because the DC—DC converter 44 uses a current-voltage converting method, and consumes more power than that consumed in the PC switching device 4 and the KB. (Problem 4)

SUMMARY OF THE INVENTION

The object of the present invention is to overcome the above-mentioned problems, and to provide a PC switching device applicable when a plurality of PC's are operated by one KB.

The another object of the present invention is to provide a PC switching device securely capable of preventing a reverse current, and to drive the man-machine interface equipment while avoiding a voltage drop.

A PC switching device according to the first aspect of the present invention is one which is installed between a keyboard without a power control key and a plurality of PC's intended for keyboards with power control keys which is connected to the keyboard without a power control key, and comprises: a plurality of power switches arranged corresponding to said plurality of PC's; a power-on state recognizing means for recognizing that when at least one of the power switches is once pressed, at least one PC corresponding to the power switch which is pressed is in the power-on state; a selective inputting means for selectively inputting commands of one set of data entry machines which include a keyboard without a power control key to one of said plurality of PC's; and a code transmitting means for transmitting codes assigned to the power control switches when the power control switches which correspond to the PC's recognized as being in power-on state by said power-on state recognizing means are pressed again and the PC's are selected by said selective inputting means.

According to the present invention, power to each PC is controlled by a power control switch, arranged on the PC switching device, when the plurality of PC's intended for a keyboard with a power control key is controlled by a keyboard without a power control key.

A PC switching device according to the second aspect of the present invention is one which is installed between a keyboard with a power control key and a plurality of PC's intended for a keyboard with a power control key is connected to a keyboard with a power control key, and comprises: a powering means for simultaneously powering to all of said plurality of PC's by pressing a power control key on the keyboard with the power control key when all of said plurality of PC's are in power-off state; a power-on state recognizing means for recognizing that all of the plurality of PC's are in a power-on state; a selective inputting means for selectively inputting commands of one set of data entry machines including a keyboard with a power control key to one of the plurality of PC's; a code transmitting means for transmitting a code assigned to the power control key when the PC's recognized as being in power-on state by said recognizing means are selected by said selective inputting means; and a powering means for powering some of the PC's recognized as being in power-off state by said recognizing means are selected by said selective inputting means, and said power control key is pressed again.

According to the present invention, power is supplied to all of the plurality of PC's when the power control key on the keyboard is pressed, and power of the selected PC's is controlled by pressing the power control key again in the case that a plurality of PC's intended for a keyboard with the power control key are controlled by a keyboard with the power control key.

A PC switching device according to the third aspect of the present invention is one which is installed between a keyboard with a power control key and a plurality of PC's each of which is intended for a keyboard with a power control key and is connected to the keyboard with a power control key, and comprises: a powering means for powering some of the plurality of PC's which have been previously selected by pressing the power control key on the keyboard when all of the plurality of PC's are in the power-off state; a recognizing means for recognizing that selected PC's are in the power-on state; a selective inputting means for selectively inputting a command from one set of data entry machines including a keyboard with a power control key to one of the plurality of PC's; and a code transmitting means for transmitting a code assigned to the power control key when the PC's recognized as being in power-on state by said recognizing means are selected by said selective inputting means and the power control key on the keyboard with a power control key is pressed again.

According to the present invention, power for selected PC's is supplied by pressing the power control key on the keyboard, and is controlled by pressing the power control key again, when a plurality of PC's each of which is intended for a keyboard with a power control key and is connected to the keyboard with a power control key.

A PC switching device according to the fourth aspect of the present invention is one which is installed between a keyboard and a plurality of PC's, and comprises: transistors each of which controls the connection between a terminal equipped in each of the plurality of PC's for powering a keyboard and a terminal equipped on a keyboard for receiving power from one of a plurality of PC's; and comparators each of which compares the voltage at the terminal equipped in each of the plurality of PC's with the voltage at the terminal equipped in the keyboard, and controls said transistor in on-state when the former is higher than the latter, but turning off other transistors when the former is lower than the latter.

According to the present invention, power is supplied from a PC to a keyboard by turning on the transistor, and power is stopped by turning off the transistor.

A PC switching device according to the fifth aspect of the present invention is one which is installed between a keyboard and a plurality of PC's, and comprises: transistors each of which controls the connection between a terminal equipped in each of the plurality of PC's for supplying power to a keyboard and a terminal equipped in the keyboard for receiving power from one of the plurality of PC's; first voltage dividers each of which divides the voltage at the terminal equipped in each of the plurality of PC's; a second voltage divider which divides the voltage at the terminal equipped in the keyboard by the ratio equal to that of the first dividers; and comparators for comparing a voltage divided by each of said first voltage dividers with the voltage divided by said second voltage divider and turning on some of said transistors when the former is higher than the latter, but turning off other transistors when the former is lower than the latter.

According to the present invention, two voltages are divided by the voltage dividers and are compared each other.

A PC switching device according to the sixth aspect of the present invention is one wherein each of the comparators is driven by power supplied from a terminal equipped in each of the plurality of PC's for supplying power to a keyboard.

A PC switching device according to the seventh aspect of the present invention is one wherein each of comparators is driven by power supplied from the terminal equipped in the keyboard for receiving electric power from a PC.

BRIEF DESCRIPTION OF THE DRAWING

FIG. 1 is a diagram showing connections between one set of man-machine interface machines and a plurality of PC's;

FIG. 2 is a diagram showing connections between PC-A and KB-A;

FIG. 4 is a circuit diagram of a conventional PC switching device;

FIG. 13 is a flowchart of the second main control routine;

FIG. 14 is a flowchart of the third main control routine;

FIG. 15 is a diagram showing connections of a PC switching device according to the third embodiment;

DESCRIPTION OF THE PREFERRED EMBODIMENT

Figure 3A:
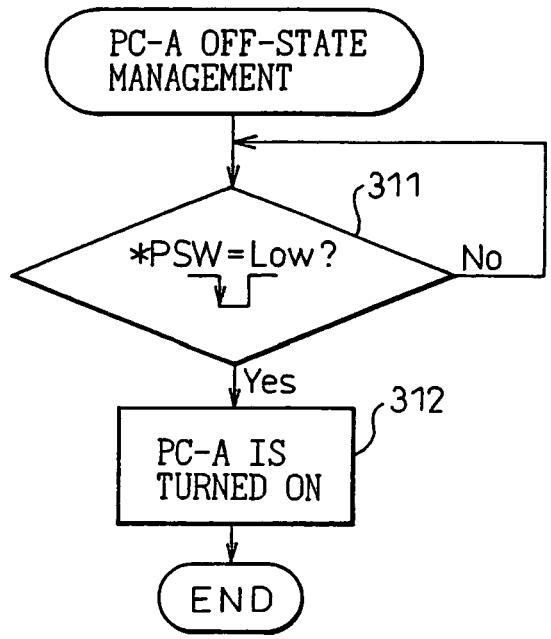
FIGS. 3A and 3B are flowcharts of a power on/off control routine using KB-PSW.
Figure 3B:
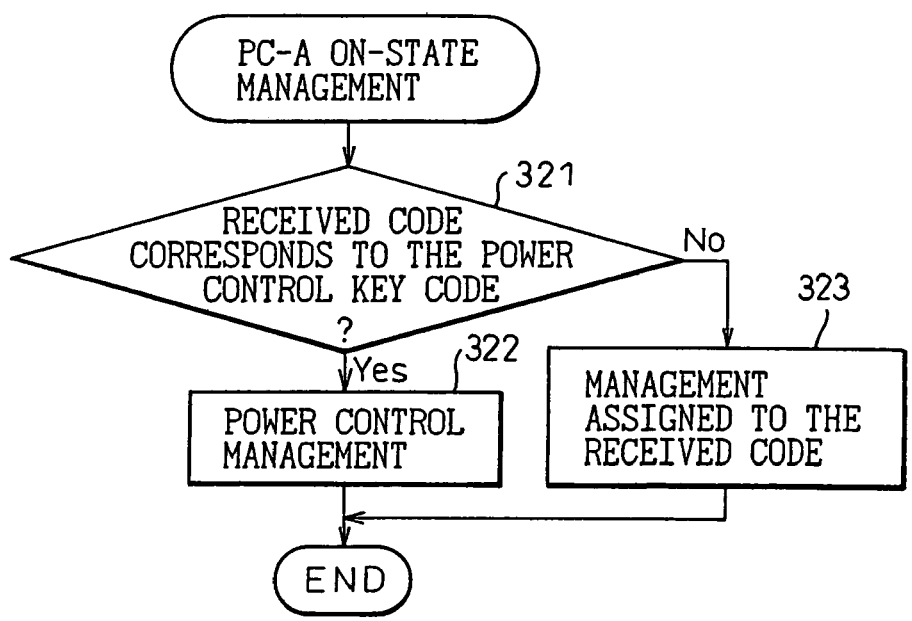
Figure 5:
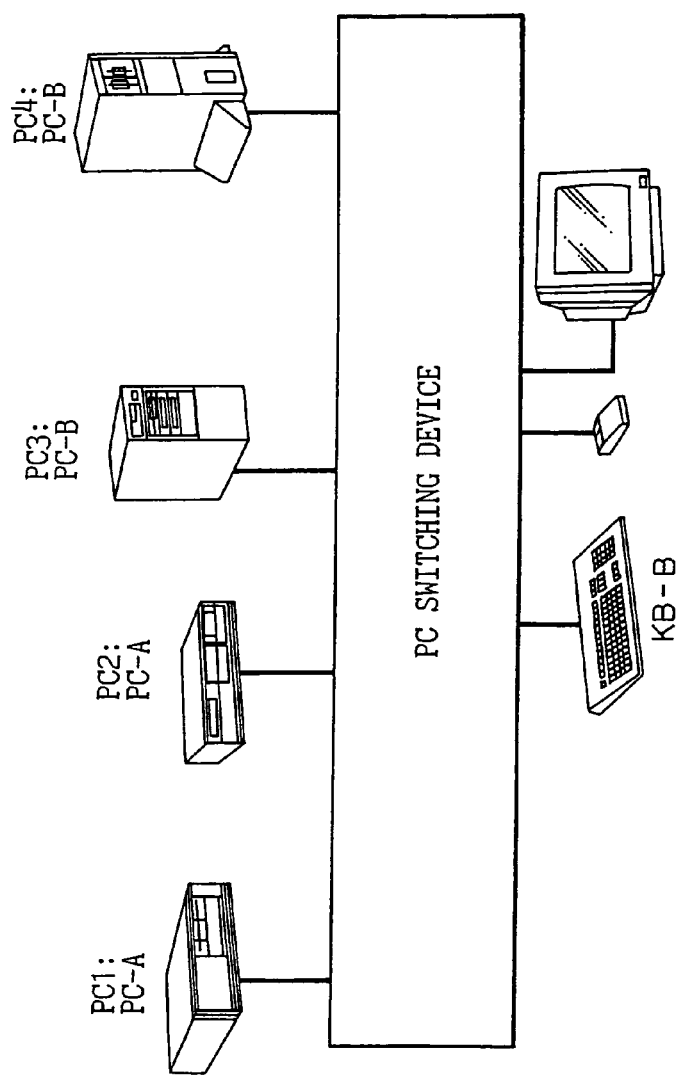
FIG. 5 is a diagram showing connections when PC-A and PC-B are connected to KB-B through a conventional PC switching device.
Figure 6:
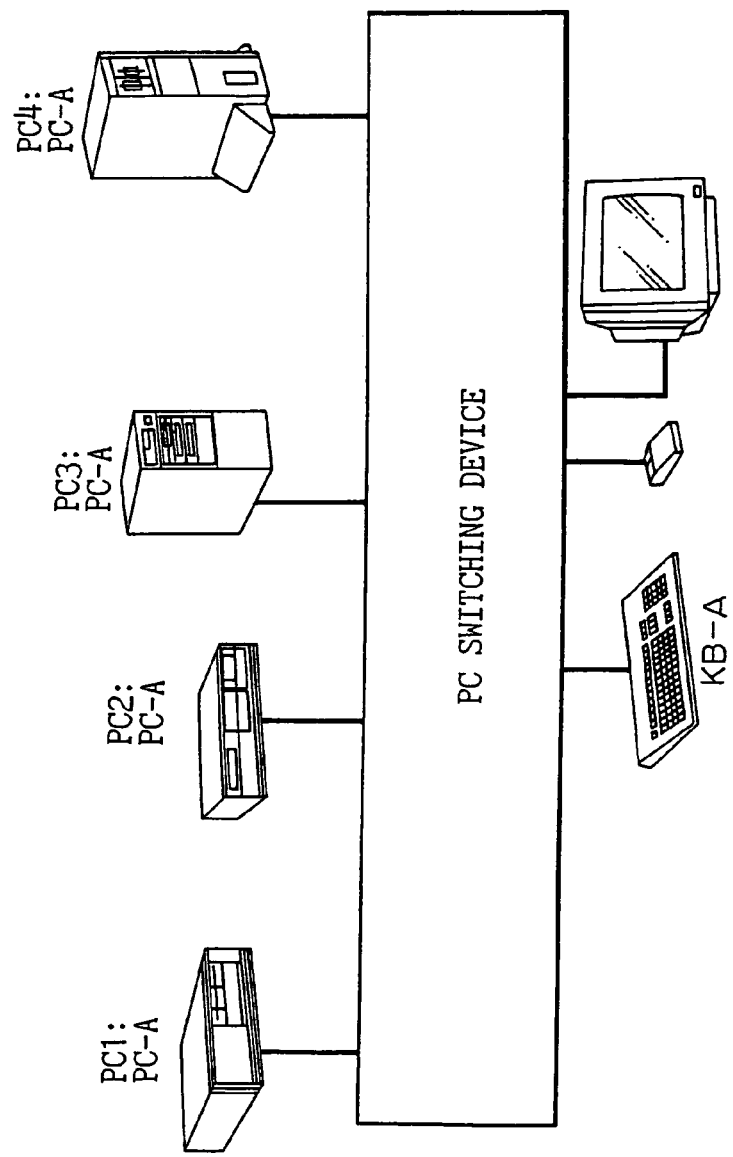
FIG. 6 is a diagram showing connections when PC-A is connected to KB-A through a conventional PC switching device.
Figure 7:
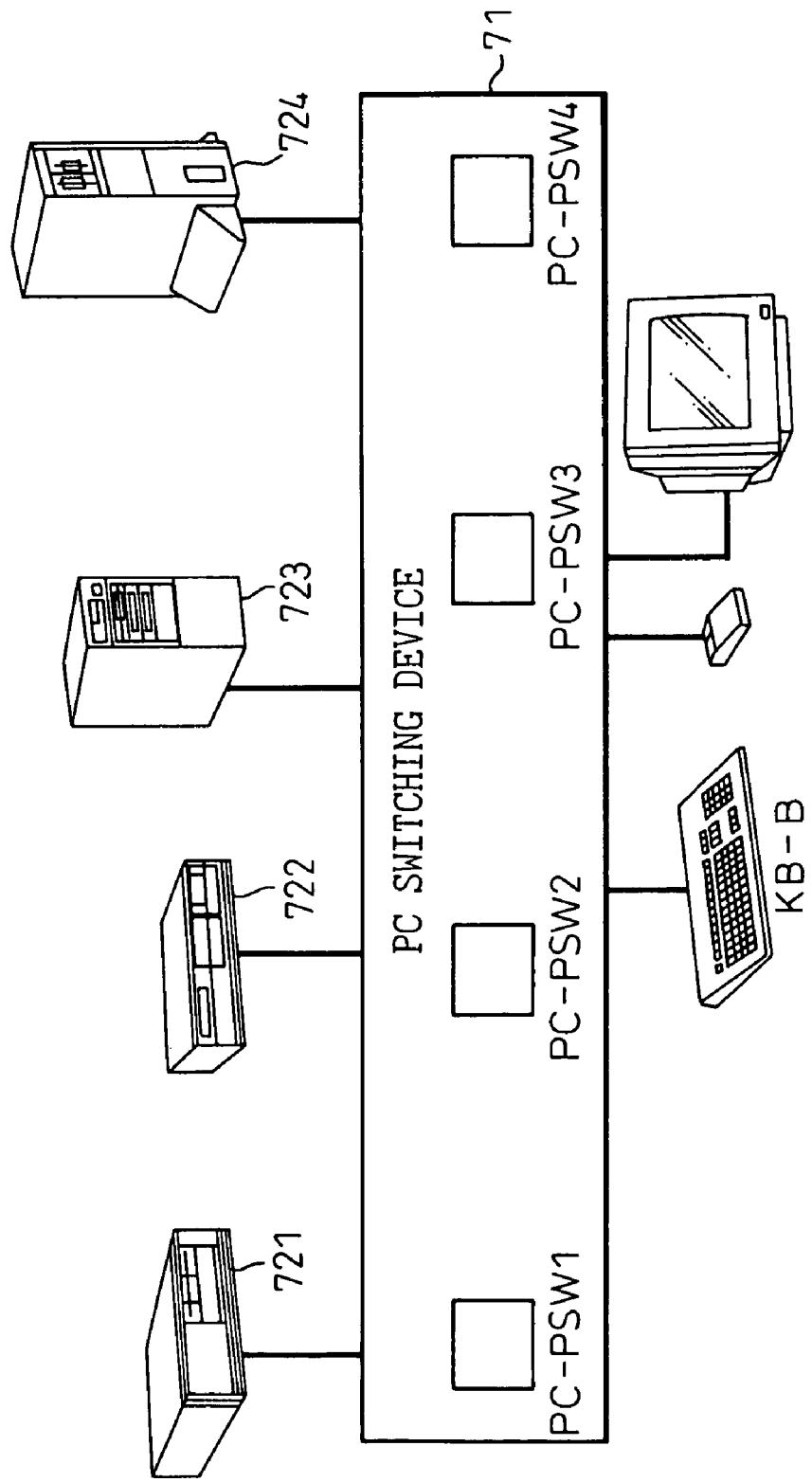
FIG. 7 is a diagram showing connections of a PC switching device according to the first embodiment.
Figure 8:
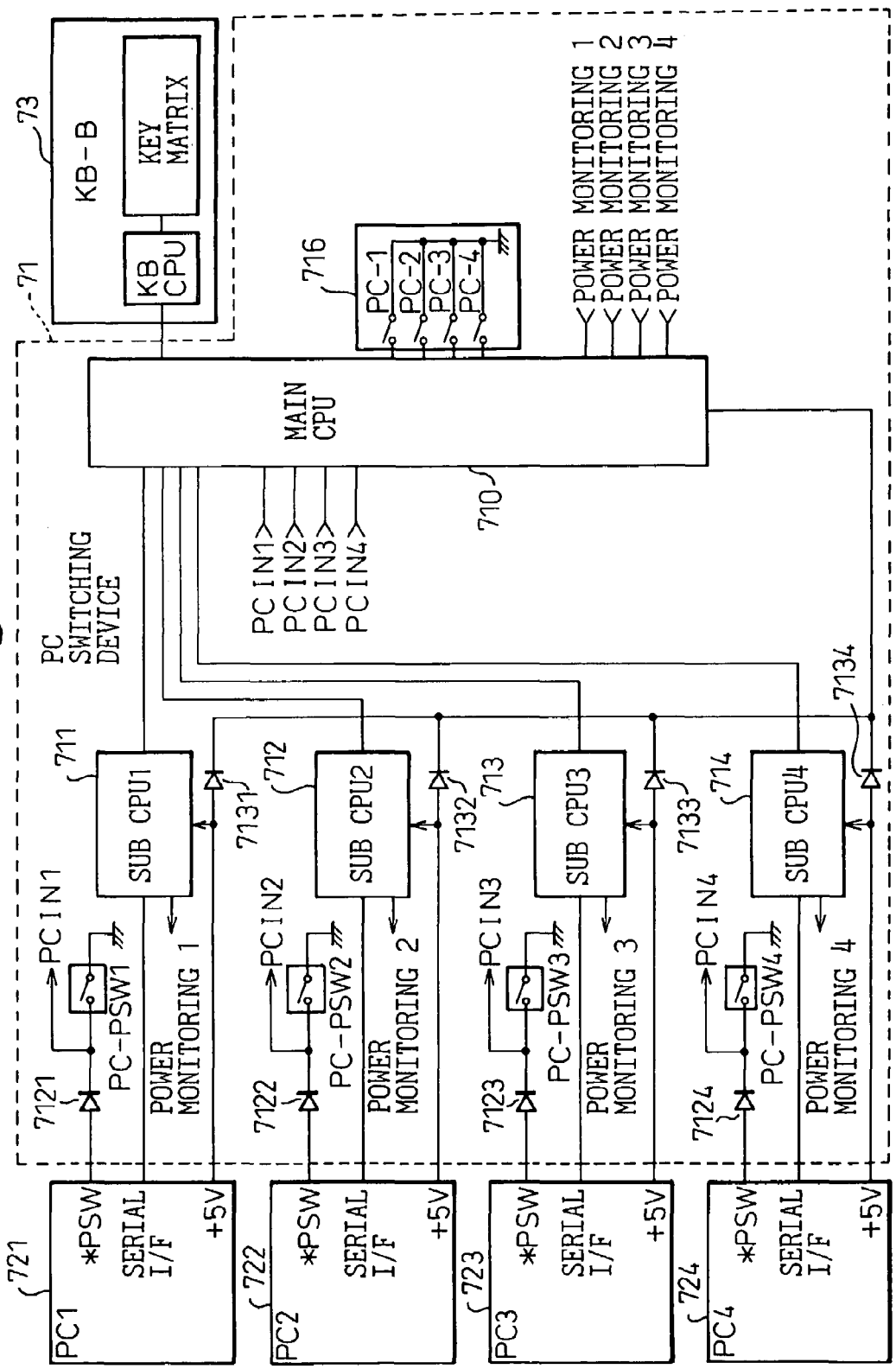
FIG. 8 is a circuit diagram of a PC switching device according to the first embodiment.

FIGS. 7 and 8 are a diagram showing connections and a circuit diagram of a PC switching device of the first embodiment according to the present invention, and aim at solving the above-mentioned first problem.

Four power control switches PC-PSW 1 to 4 and one changeover switch 716 are installed on PC switching device 71 which can control four PC's.

Four PC's PC-A 721 to 724 and one keyboard KB-B 73 are connected to PC switching device 71.

PC switching device 71 includes one main-CPU 710 and four sub-CPU's 711 to 714 besides four power control switches PC-PSW 1 to 4.

One terminal of power control switch PC-PSW1 is grounded, and another terminal is connected to power supply terminal *PSW of PC-A 721 though first reverse current protecting diode 7121. Further, another terminal is directly connected to main CPU 710.

A serial interface of PC-A 721 is connected to main CPU 710 though sub CPU 711.

A +5V terminal of PC-A 721 is connected directly to sub CPU 711, and to main CPU 710, though second reverse current protecting diode 7131. Note, because connections between other PC's PC-A 722 to 4 and PC switching device 71 are the same as the above-mentioned connections between PC-A 721 and PC switching device 71, explanations are omitted.

Therefore, power of main CPU 710 is supplied from at least one of PC's PC-A 721 to 724, and each of four sub-CPU's 711 to 714 receives power from corresponding PC, that is, one of four PC's PC-A721 to 724.

When a pulse is generated by pressing one of power control switches PC-PSW1 to 4 installed on PC switching device 71, one of PC's PC-A721 to 4 is turned on, and main CPU 710 and sub CPU 71$i$ receive power from PC-A72$i$.

Figure 9:
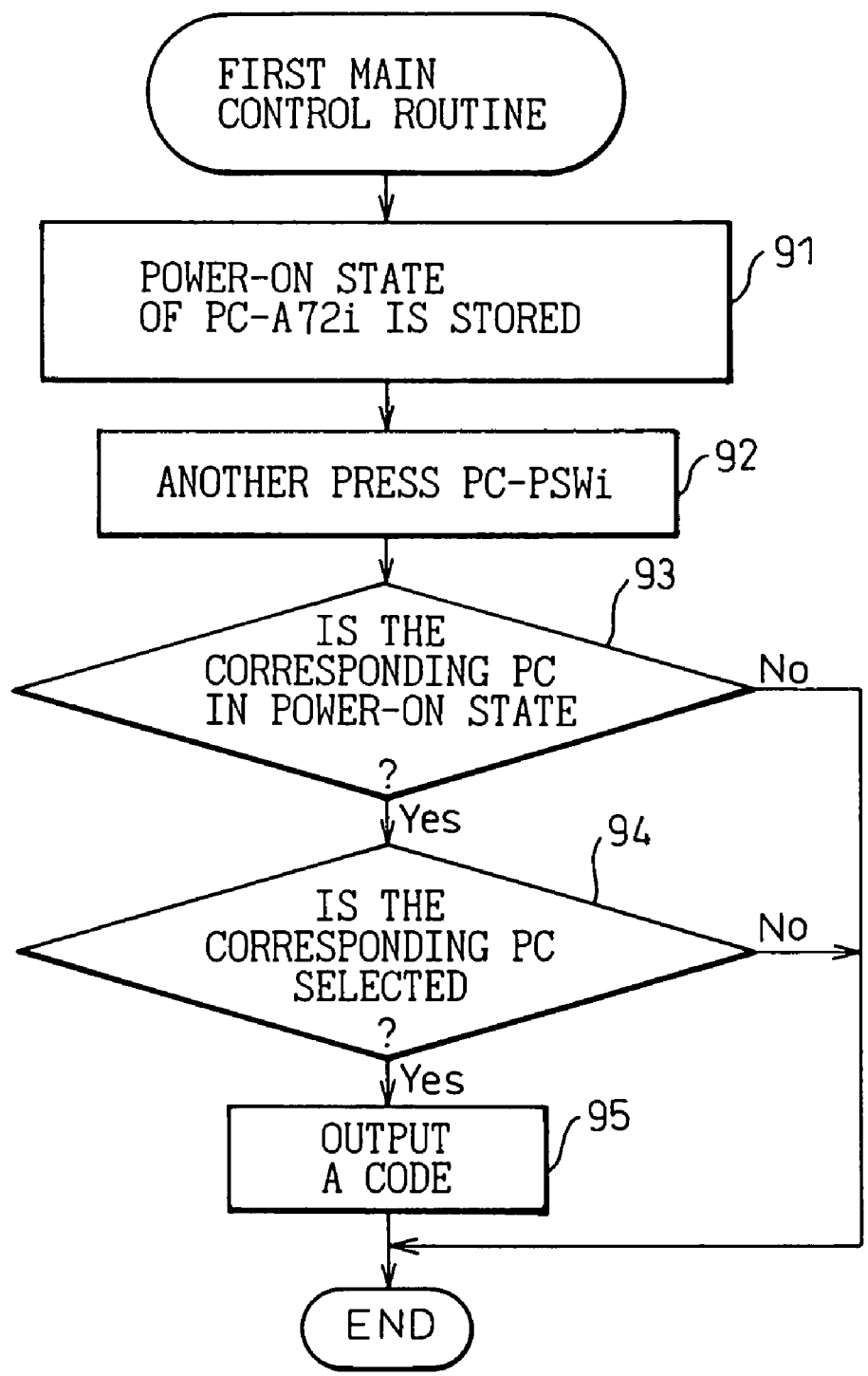
FIG. 9 is a flowchart of a first main control routine.

FIG. 9 is a flowchart of a first main control routine executed in main CPU 710, the power-on state of PC-A 72$i$ is stored at step 91.

When another press of power control switch PC-PSWi is detected at step 92, it is determined whether or not PC-A72$i$ corresponding to power control switch PC-PSWi is in a power-on state at step 93, and it is determined whether or not the corresponding PC is selected by the changeover switch 716 at step 94 when the determination at step 93 is affirmative. When the determination at step 94 is affirmative, this routine is terminated after the code assigned to PC-PSWi is output at step 95.

Note, when the determinations at steps 93 and 94 are negative, this routine is directly terminated.

Figure 10:
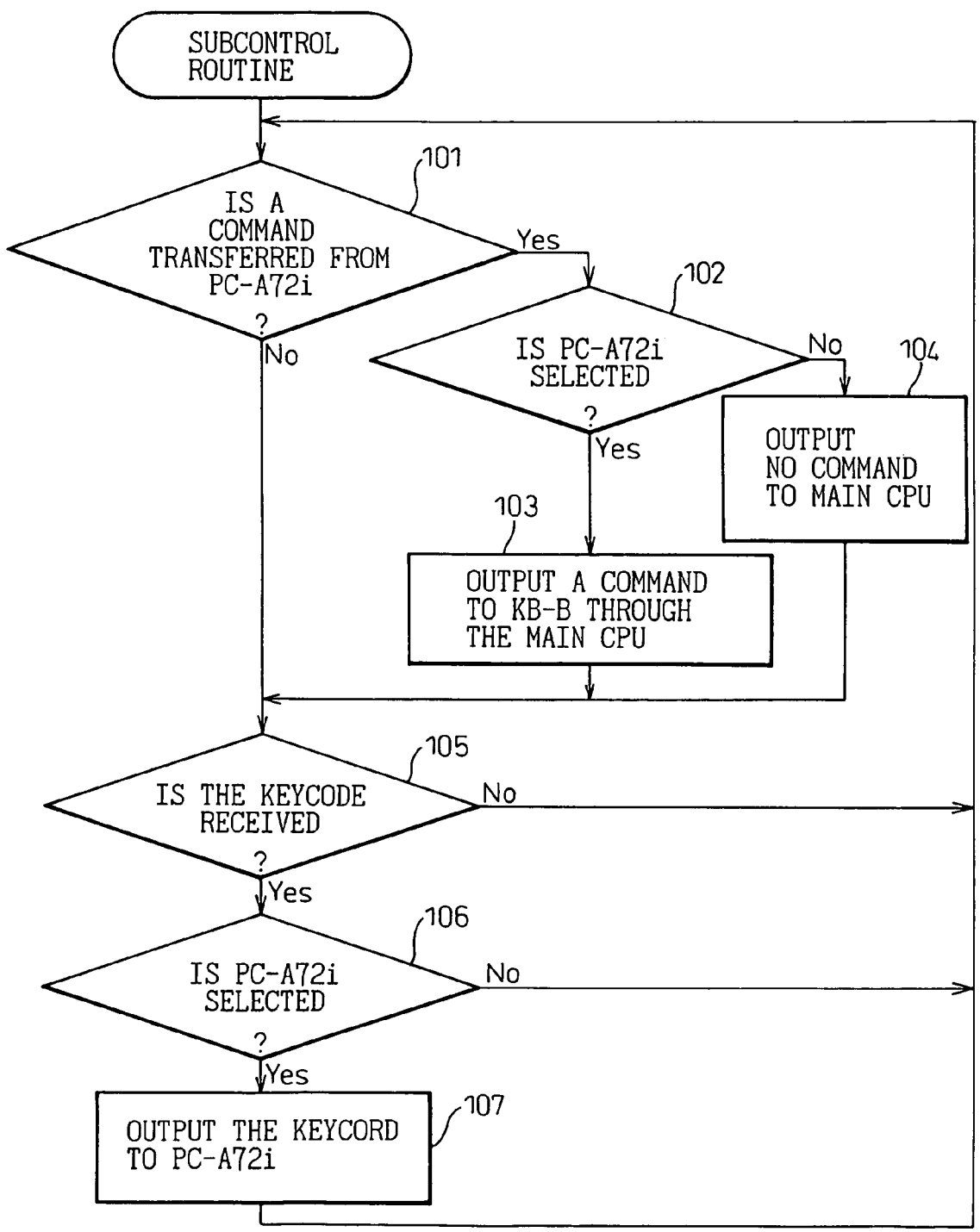
FIG. 10 is a flowchart of a sub-control routine.

FIG. 10 is a flowchart of a sub-control routine executed in sub-CPU 711 to 4, it is determined whether or not a command is transferred from PC-PSWi at step 101.

When the determination at step 101 is affirmative, that is, when a command is transferred from PC-A 72$i$, the control proceeds to step 102 for determining whether or not PC-A 72$i$ is selected by the changeover switch 716.

When the determination at step 102 is affirmative, the control proceeds to step 105 after sending the command transferred from PC-PSW1 to KB-B though main CPU 710 at step 103.

When the determination at step 102 is negative, the control proceeds to step 105 without sending the command to KB-B at step 104. When the determination at step 101 is negative, that is, when no command is transferred from PC-A 72*i*, the control directly proceeds to step 105.

It is determined whether or not the keycode assigned to PC-PSWi is received at step 105, and when the determination at step 105 is affirmative, the control proceeds to step 106 for determining whether or not PC-A 72*i* is selected by the changeover switch 716.

When the determination at step 106 is affirmative, that is, when PC-A72*i* is selected, the control returns to step 101 after outputting the keycode to PC-A 72*i* at step 107.

When the determinations at steps 105 and 106 are negative, the control directly returns to step 101.

PC-A 72*i* executes a process corresponding to the keycode.

Figure 11:
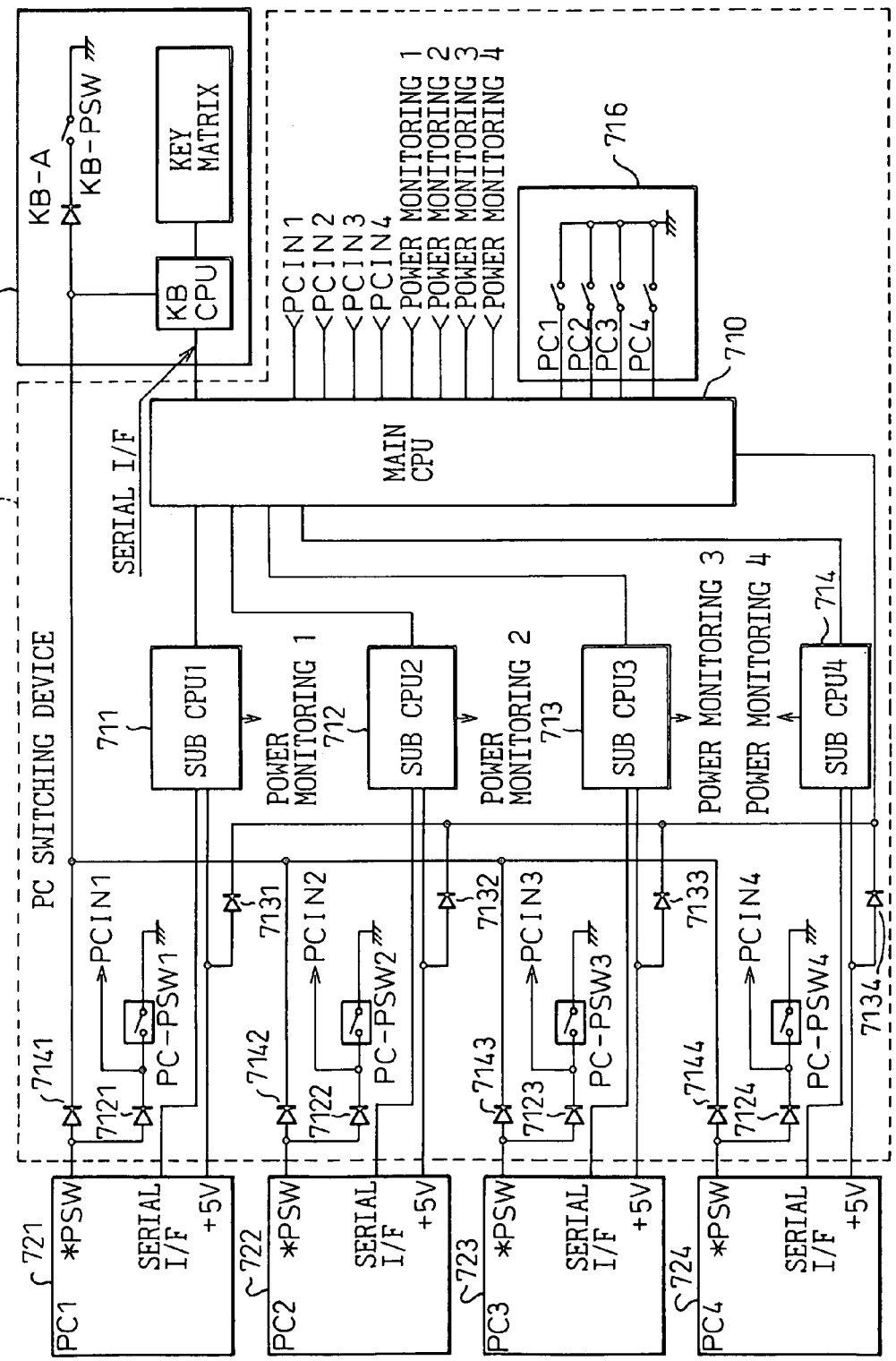
FIG. 11 is a circuit diagram when a PC switching device according to the first embodiment is connected to KB-A.

FIG. 11 is a diagram showing connection in the case of connecting four personal computers PC-A 721 to 724 to keyboard KB-A 74 though a PC switching device according to the first embodiment, a power control switch KB-PSW is connected to each of *PSW terminals of PC-A 721 to 724 through third reverse current protecting diodes 7141 to 7144.

In this case, it is possible simultaneously to turn on all of PC-A 721–724 by pressing the power control key KB-PSW, but it is not possible to control power individually.

For example, after all of PC-A721–724 have been turned on by pressing the power control key KB-PSW, the power of PC-A721 can be controlled when PC-A721 is selected by setting changeover switch 716 at PC1 position, and the power control key KB-PSW is pressed again.

But after selecting PC-A 722 by setting the changeover switch 716 at PC2 position, the power for PC-A 722 can be controlled, but it is not avoidable to turning on PC-A 721.

Figure 12:
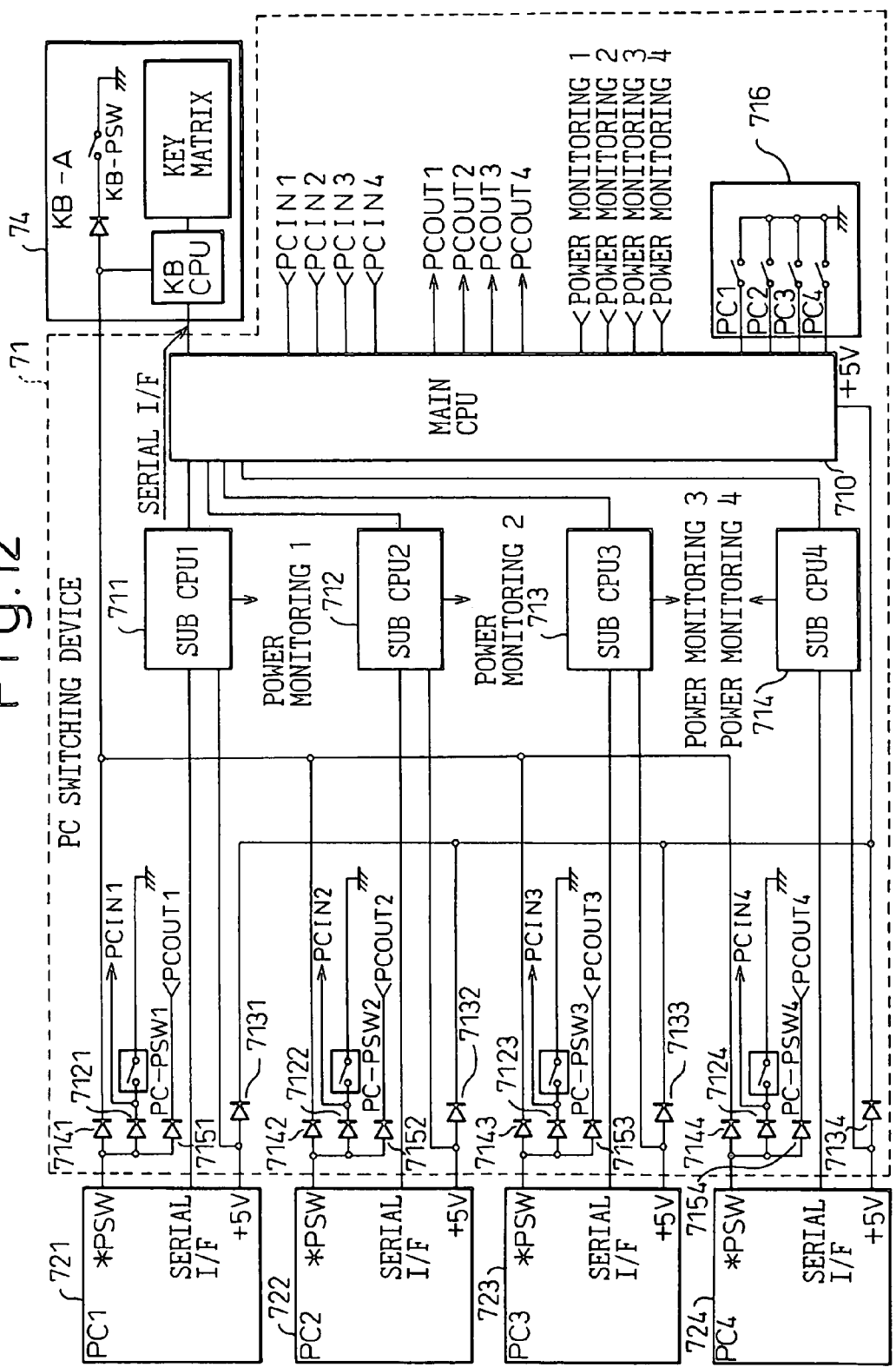
FIG. 12 is a diagram showing connections of a PC switching device according to the second embodiment.

FIG. 12 is a circuit diagram of the second embodiment of the PC switching device according to the present invention, and has the object to solve the above-mentioned second problem. And, the same reference numerals are used for the components used in the first embodiment.

In the second embodiment, fourth reverse current protecting diodes 7151–7154 which are installed between the anode sides (that is, PC sides) of the third reverse current protecting diodes 7141–7144 and outputs PCOUT 1–4 of main CPU 710 are inserted in addition to the first embodiment.

FIG. 13 is a flowchart of a second main control routine executed in main CPU 710, and executed during at least one of PC-A 721–724 is in power-on state.

When a pulse is supplied to the terminal *PSW of PC by pressing the power control key KB-PSW, power is supplied to PC-A 721–724, main CPU 710, and corresponding sub-CPU 71*i*.

Then the second main control routine begins to execute, and recognizes which of PC-A 721 to 724 are turned on at step 1301.

The *PSW terminals of PC-A 721 to 724 are clamped at a low level by controlling the corresponding outputs PCOUT 1 to 4 of main CPU 710 at a low level, and the routine is terminated.

FIG. 14 is a flowchart of a third main control routine executed in main CPU 710, and executed when at least one of PC-A 721 to 724 is turned on.

PC-A 72*i* which will be turned off is selected by the changeover switch 716 at step 1401.

Note, the changeover switch 716 may be a mechanical switch or a switch put in the software which is realized by a specified operation of the keyboard (for example, a simultaneous press of "Ctrl" key, "Shift" key, and "Numeral" key).

When KB-PSW installed on KB-A is pressed at step 1402, this routine is terminated after outputting the keycode to PC-A 72*i* through the sub-CPU 71*i*.

According to the second embodiment, because the *PSW terminal is clamped at a low level after PC-A 72*i* has turned on, the *PSW terminal of PC-A 72*i* cannot detect a change of logic level caused by pressing KB-PSW. Therefore, it is prevented from to turn on PC-A721 though power of PC-A722 is controlled by selecting PC-A 722 using the changeover switch 716 and pressing KB-PSW after PC-A721 is once turned off.

When one PC is in power-on state, it is possible to turn on a PC which is selected by a trailing pulse generated at a PCOUT terminal by a momentary release of a low level clamp at *PSW when selecting the PC which is recognized as power-off state and pressing KB-PSW.

According to the second embodiment, when KB-PSW is pressed during all PC's PC-A 721 to 724 are turned off, all PC's are turned on simultaneously by pressing KB-PSW, but power of PC's cannot be individually controlled.

FIG. 15 is a circuit diagram of the third embodiment of the PC switching device according to the present invention, and the embodiment aims to solve the above-mentioned problem. And, the same reference numerals are used for the components used in the first and second embodiments.

PC PC-A72*i* which should be turned on when being pressed KB-PSW can be selected by installing dipswith 717 between the power control switch KB-PSW of the keyboard KB-A74 and each of *PSW terminals of PC's PC-A 721 to 724.

Note, it is possible to operate more than four PC's by connecting the PC switching devices in series.

According to the above-mentioned embodiment, a forward voltage drop caused by each of the reverse current protecting diodes 7131–7134 and 7141–7144 is not avoidable because the main CPU 710 in the PC switching device and the keyboard 74 receive power though the reverse current protecting diodes 7131–7134 and 7141–7144.

Figure 16:
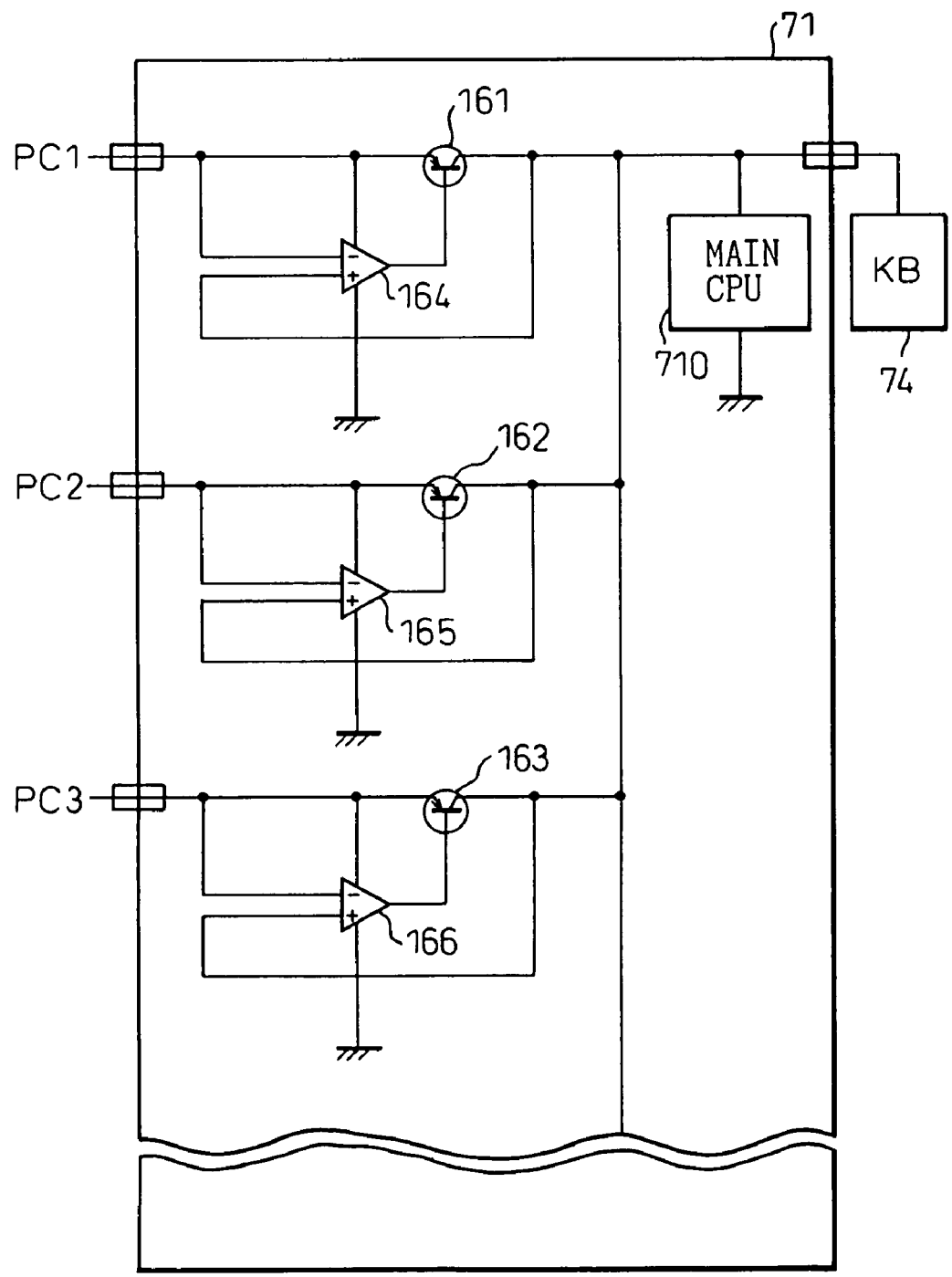
FIG. 16 is a diagram showing connections of a PC switching device according to the forth embodiment.

FIG. 16 is a circuit diagram of the fourth embodiment of the PC switching device according to the present invention, and shows only a power supply circuit to prevent the forward voltage drop of the reverse current protecting diode from dropping.

Each of the *PSW terminals or the +5V terminals of PC's 1 to 3 is connected to each of emitters of PNP transistors 161–163 respectively, and their collectors are connected in common for supplying power to main CPU 710 and keyboard 74.

Each of transistors 161 to 163 is controlled by each of comparators 164 to 167 comprised of operational amplifiers. Each inverted terminal of the comparators 164 to 167 is connected to the *PSW terminals or the +5V terminals, and each of non-inverted terminals of the comparators 164 to 167 is connected to each of the collectors of PNP transistors 161 to 163 respectively. Note, each of line terminals of the comparators 164 to 167 is connected to each of the *PSW terminals or the +5V terminals of PC's 1 to 3.

For example, consider that the voltage at the *PSW terminal or the +5V terminal of PC1 is 5.1V and that of PC2 is 4.9V.

In this case, only the first PNP transistor 161 is turned on, and the second and third PNP transistors 162 and 163 are turned off, because the forward voltage drop of PNP transistor is about 0.1V and then the voltage applied to the non-inverted terminal becomes higher than the voltage applied to the inverted terminal only in the first comparator 164.

Therefore, power from PC1 is supplied to main CPU710 and keyboard 74 with less voltage drop, and the reverse current from PC2 or PC3 to PC1 is surely protected.

According to the fourth embodiment, the voltage applied to the line terminal of the operational amplifier is nearly equal to the voltage applied to its input terminal, but normal operation is guaranteed when the latter is lower than the former.

Figure 17:
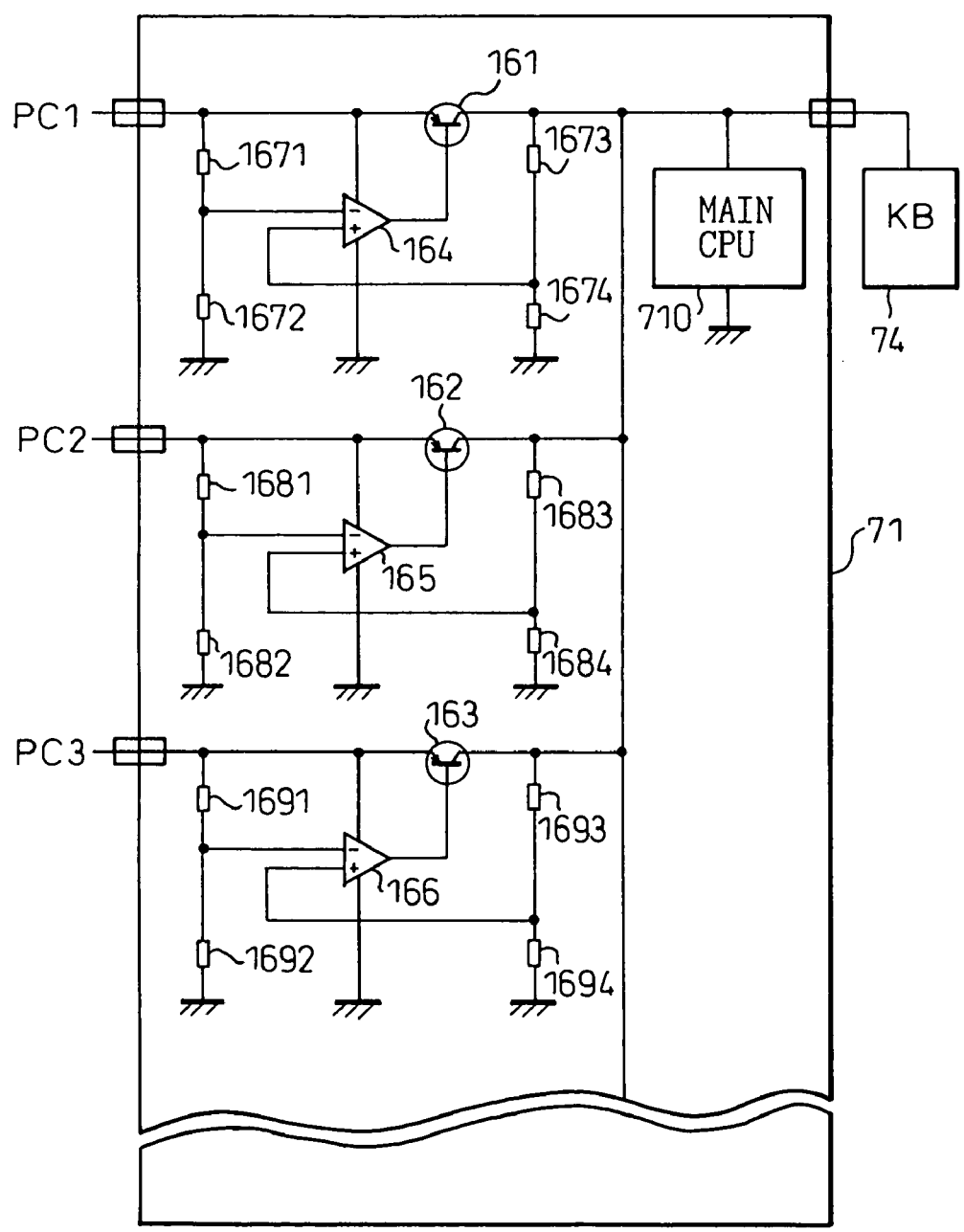
FIG. 17 is a diagram showing connections of a PC switching device according to the fifth embodiment.

FIG. 17 is a circuit diagram of the fifth embodiment of the PC switching device according to the present invention, and a voltage dividing circuit is applied for dropping the voltage applied to the input terminal lower than the voltage applied to the line terminal.

The voltage applied to the inverted terminal of the first comparator 164 is divided by resistors 1671 and 1672, and the voltage applied to its non-inverted terminal is divided by resistors 1673 and 1674.

When the resistance of the resister 1671 is $R_1$, that of the resistor 1672 is $R_2$, and the voltage at the PSW terminal or the +5V terminal of PC1 is $V_1$, the voltage $V_{i1}$, applied to the inverted terminal of the first comparator 164 can be calculated by the following equation.

$$V_{i1}=[R_2/(R_1+R_2)]\times V_1$$

When the resistance of the resister 1673 is $R_3$, that of the resistor 1674 is $R_4$, and the voltage applied to main CPU 710 and keyboard 74 is V, the voltage $V_{n1}$ applied to the non-inverted terminal of the first comparator 164 can be calculated by the following equation.

$$V_{n1}=[R_4/(R_3+R_4)]\times V$$

According to the fifth embodiment, the normal operation of the amplifier is surely guaranteed by dropping the voltage applied to the input terminal to lower than that applied to the line terminal.

According to the above-mentioned fourth and fifth embodiments, because power for comparators 164–166 is supplied from each of the *PSW terminals or the +5V terminals of PC1 to 3 respectively, each of comparators 164 to 166 must be constructed by discrete operational amplifier and it is not avoidable that the number of operational amplifiers are increased.

Figure 18:
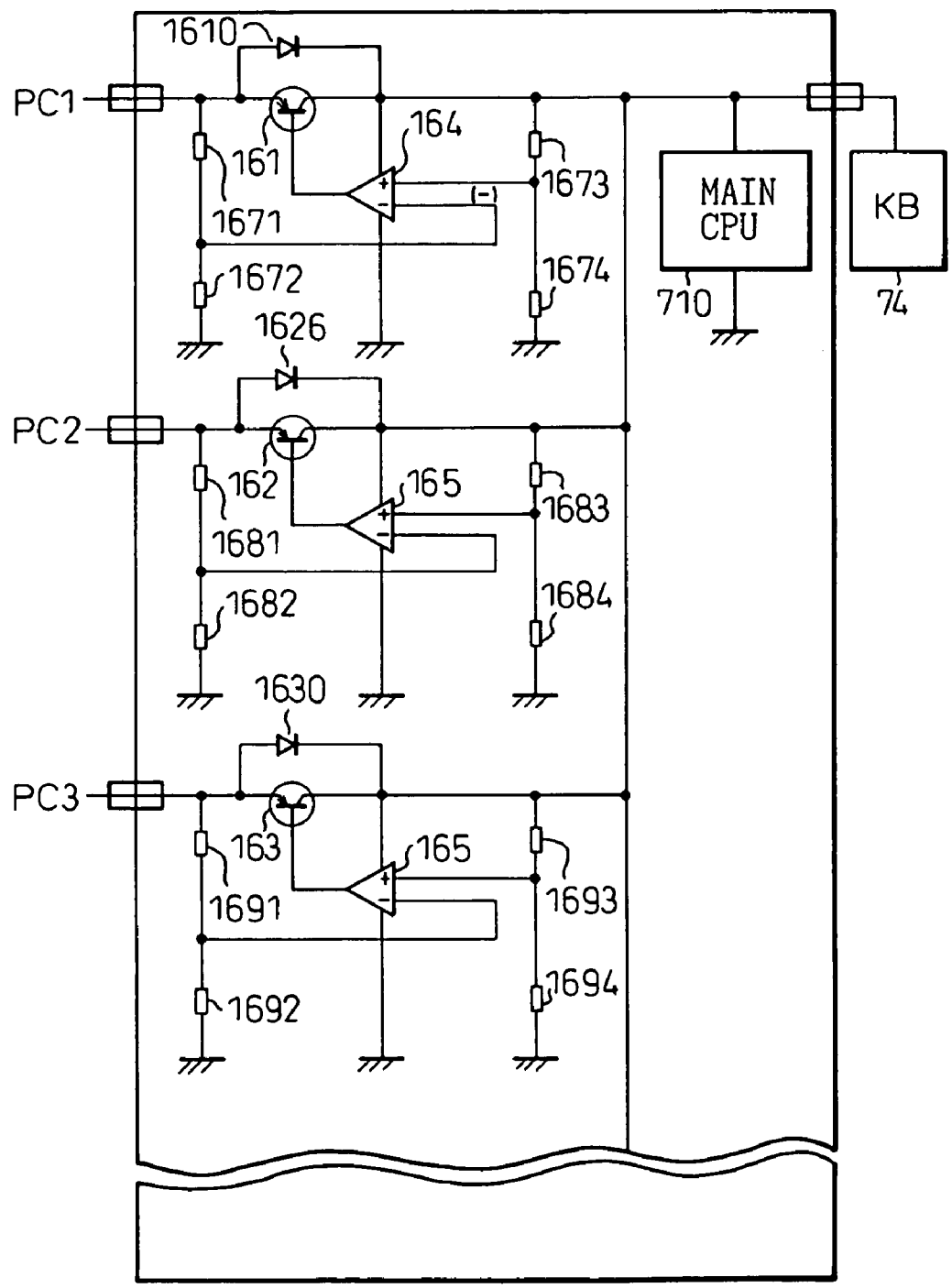
FIG. 18 is a diagram showing connections of a PC switching device according to the sixth embodiment.

FIG. 18 is a circuit diagram of a sixth embodiment of the PC switching device according to the present invention, and it is possible to use an integrated circuit including a plurality of operational amplifiers as comparators, and decrease the number of elements by supplying power for comparators 164 to 166 from the collector sides of PNP transistors 161 to 163.

However, it is necessary to install diodes 1610 to 1630 between the emitters and the collectors of the transistors 161 to 163 for turning on the comparators before controlling the PNP transistors 161 to 163.

In this case, voltage drops caused by the forward voltage drops of the diodes 1610 to 1630 are not avoidable, and the voltage of the driving power of comparators is dropped by about 0.25V lower than that of the *PSW terminal or the +5V terminal of each of PC's 1 to 3.

Therefore, it is desired to apply a low voltage type as an integrated circuit used for comparators.

The voltage divider is applied in the sixth embodiment, but it can be omitted as the fourth embodiment.

According to the first embodiment, it becomes possible to control each of the personal computers by a power control switch installed on a PC switching device, when a plurality of personal computers fit for keyboards with power control keys are connected to a keyboard which has no power control key.

According to the second embodiment, it becomes possible to turn on all of personal computers by pressing a power control key on a keyboard, and to control power of all personal computers by another pressing the power control key, when a plurality of personal computers fit for keyboards with power control keys are connected to a keyboard which has a power control key.

According to the third embodiment, it becomes possible to turn on selected personal computers by pressing a power control key on a keyboard, and to control power for selected personal computers by another pressing the power control key, when a plurality of personal computers fit for keyboards with power control keys are connected to a keyboard which has a power control key.

According to the fourth-seventh embodiments, it becomes possible securely to drive the keyboard because power of the PC switching device and the keyboard is supplied through a transistor with little forward voltage drop, and to prevent a reverse current from flowing because other transistors are turned off.

What is claimed is:

1. A PC switching device, installed between a keyboard without a power control key and a plurality of personal computers, intended for keyboards with power control keys, that are connected to the keyboard without a power control key, comprising:

a plurality of power control switches corresponding respectively to the plurality of personal computers;

recognizing means for recognizing that some of the plurality of personal computers, which correspond to at least one of the plurality of power control switches firstly pressed, are in a power-on state;

selective inputting means for selectively inputting commands from the keyboard without a power control key to one of the plurality of personal computers;

code transmitting means for transmitting codes assigned to the power control switches to certain ones of the personal computers and powering off the same when the certain ones of the personal computers in the power-on state are selected by the selective inputting means and the power control switches that correspond to the certain ones of the personal computers in the power-on state are pressed again;

transistors controlling connecting states between power supply terminals of the plurality of personal computers for powering the keyboard and a power receiving terminal of the keyboard;

comparators comparing a first voltage at each of the power supply terminals with a second voltage of the power receiving terminal, and turning on some of the transistors when the former is higher than the latter, but turning off other transistors when the former is lower than the latter;

first voltage dividers dividing a voltage at each of the power supply terminals; and second voltage dividers dividing a voltage at the power receiving terminal by a ratio equal to that of a corresponding one of the first voltage dividers, wherein the first voltage is a voltage divided by each of the first voltage dividers, and the second voltage is a voltage divided by each of the second voltage dividers.

2. A PC switching device installed between a keyboard without a power control key and a plurality of personal computers, intended for keyboards with power control keys, that are connected to the keyboard without a power control key, comprising:
a plurality of power control switches corresponding respectively to the plurality of personal computers;
recognizing means for recognizing that some of the plurality of personal computers, which correspond to at least one of the plurality of power control switches firstly pressed, are in a power-on state;
selective inputting means for selectively inputting commands from the keyboard without a power control key to one of the plurality of personal computers;
code transmitting means for transmitting codes assigned to the power control switches to certain ones of the personal computers and powering off the same when the certain ones of the personal computers in the power-on state are selected by the selective inputting means and the power control switches that correspond to the certain ones of the personal computers in the power-on state are pressed again;
transistors controlling connecting states between power supply terminals of the plurality of personal computers for powering the keyboard and a power receiving terminal of the keyboard; and
comparators comparing a first voltage at each of the power supply terminals with a second voltage of the power receiving terminal, and turning on some of the transistors when the former is higher than the latter, but turning off other transistors when the former is lower than the latter,
wherein the comparators are driven by power supplied from the power supply terminals of the plurality of personal computers, or from the power receiving terminal of the keyboard.

3. A PC switching device installed between a keyboard with a power control key and a plurality of personal computers intended for keyboards with power control keys, comprising:
powering means for powering all of the plurality of personal computers simultaneously by pressing the power control key on the keyboard when the plurality of personal computers are in a power-off state;
recognizing means for recognizing that all of the plurality of personal computers are in the power-on state;
selective inputting means for selectively inputting commands from one set of input devices, including the keyboard with a power control key, to one of the plurality of personal computers;
code transmitting means for transmitting a code assigned to the power control key to certain ones of the personal computers and powering off the same, when the certain ones of the personal computers recognized as being in the power-on state by the recognizing means are selected by the selective inputting means and the power control key on the keyboard is pressed again to power off the certain ones of the personal computers;
transistors controlling connecting states between power supply terminals of the plurality of personal computers for powering the keyboard and a power receiving terminal of the keyboard;
comparators comparing a first voltage at each of the power supply terminals with a second voltage of the power receiving terminal, and turning on some of the transistors when the former is higher than the latter, but turning off other transistors when the former is lower than the latter;
first voltage dividers dividing a voltage at each of the power supply terminals; and
second voltage dividers dividing a voltage at the power receiving terminal by a ratio equal to that of a corresponding one of the first voltage dividers, wherein
the first voltage is a voltage divided by each of the first voltage dividers, and
the second voltage is a voltage divided by each of the second voltage dividers.

4. A PC switching device installed between a keyboard with a power control key and a plurality of personal computers intended for keyboards with power control keys, comprising:
powering means for powering all of the plurality of personal computers simultaneously by pressing the power control key on the keyboard when the plurality of personal computers are in a power-off state;
recognizing means for recognizing that all of the plurality of personal computers are in the power-on state;
selective inputting means for selectively inputting commands from one set of input devices, including the keyboard with a power control key, to one of the plurality of personal computers;
code transmitting means for transmitting a code assigned to the power control key to certain ones of the personal computers and powering off the same, when the certain ones of the personal computers recognized as being in the power-on state by the recognizing means are selected by the selective inputting means and the power control key on the keyboard is pressed again to power off the certain ones of the personal computers;
transistors controlling connecting states between power supply terminals of the plurality of personal computers for powering the keyboard and a power receiving terminal of the keyboard; and
comparators comparing a first voltage at each of the power supply terminals with a second voltage of the power receiving terminal, and turning on some of the transistors when the former is higher than the latter, but turning off other transistors when the former is lower than the latter;
wherein the comparators are driven by power supplied from the power supply terminals of the plurality of personal computers, or from the power receiving terminal of the keyboard.

5. A PC switching device installed between a keyboard with a power control key and a plurality of personal computers capable of being powered using keyboards with power control keys, comprising:
powering means for powering some of the plurality of personal computers previously selected by pressing the power control key on the keyboard when all of the plurality of personal computers are in a power-off state;
recognizing means for recognizing that the selected personal computers are turned on;
selectively inputting means for selectively inputting commands from one set of input devices, including the keyboard with a power control key, to one of the plurality of personal computers;
code transmitting means for transmitting a code assigned to the power control key to certain ones of the personal computers and powering off the same, when the certain ones of the personal computers recognized as being in the power-on state by the recognizing means are selected by the selective inputting means and the power control key on the keyboard is pressed again to power off the certain ones of the personal computers;

transistors controlling connecting states between power supply terminals of the plurality of personal computers for powering the keyboard and a power receiving terminal of the keyboard; and comparators comparing a first voltage at each of the power supply terminals with a second voltage of the power receiving terminal, and turning on some of the transistors when the former is higher than the latter, but turning off other transistors when the former is lower than the latter;

first voltage dividers dividing a voltage at each of the power supply terminals; and second voltage dividers dividing a voltage at the power receiving terminal by a ratio equal to that of a corresponding one of the first voltage dividers, wherein the first voltage is a voltage divided by each of the first voltage dividers, and the second voltage is a voltage divided by each of the second voltage dividers.

6. A PC switching device, installed between a keyboard with a power control key and a plurality of personal computers capable of being powered using keyboards with power control keys, comprising:

powering means for powering some of the plurality of personal computers previously selected by pressing the power control key on the keyboard when all of the plurality of personal computers are in a power-off state;

recognizing means for recognizing that the selected personal computers are turned on;

selectively inputting means for selectively inputting commands from one set of input devices, including the keyboard with a power control key, to one of the plurality of personal computers;

code transmitting means for transmitting a code assigned to the power control key to certain ones of the personal computers and powering off the same, when the certain ones of the personal computers recognized as being in the power-on state by the recognizing means are selected by the selective inputting means and the power control key on the keyboard is pressed again to power off the certain ones of the personal computers;

transistors controlling connecting states between power supply terminals of the plurality of personal computers for powering the keyboard and a power receiving terminal of the keyboard; and comparators comparing a first voltage at each of the power supply terminals with a second voltage of the power receiving terminal, and turning on some of the transistors when the former is higher than the latter, but turning off other transistors when the former is lower than the latter, wherein the comparators are driven by power supplied from the power supply terminals of the plurality of personal computers, or from the power receiving terminal of the keyboard.

* * * * *

UNITED STATES PATENT AND TRADEMARK OFFICE
CERTIFICATE OF CORRECTION

| | | |
|---|---|---|
| PATENT NO. | : 7,003,612 B1 | Page 1 of 1 |
| APPLICATION NO. | : 09/632587 | |
| DATED | : February 21, 2006 | |
| INVENTOR(S) | : Kiyomitsu Takizawa et al. | |

It is certified that error appears in the above-identified patent and that said Letters Patent is hereby corrected as shown below:

First Page, Column 2 (Abstract), delete extra space between "others. and when a plurality"

Signed and Sealed this

Twenty-fifth Day of July, 2006

JON W. DUDAS
*Director of the United States Patent and Trademark Office*